(12) United States Patent
Choi et al.

(10) Patent No.: US 11,624,146 B2
(45) Date of Patent: Apr. 11, 2023

(54) CLOTHING TREATING APPARATUS

(71) Applicant: LG ELECTRONICS INC., Seoul (KR)

(72) Inventors: Junyoung Choi, Seoul (KR); Wansik Nam, Seoul (KR); Sunghoo Park, Seoul (KR); Hyeyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/264,233

(22) PCT Filed: Jul. 30, 2019

(86) PCT No.: PCT/KR2019/009476
§ 371 (c)(1),
(2) Date: Jan. 28, 2021

(87) PCT Pub. No.: WO2020/027542
PCT Pub. Date: Feb. 6, 2020

(65) Prior Publication Data
US 2021/0301458 A1  Sep. 30, 2021

Related U.S. Application Data

(60) Provisional application No. 62/711,629, filed on Jul. 30, 2018.

(51) Int. Cl.
*D06F 58/10* (2006.01)
*B29C 44/14* (2006.01)
(Continued)

(52) U.S. Cl.
CPC .............. *D06F 58/10* (2013.01); *B29C 44/14* (2013.01); *B29C 44/18* (2013.01); *B29C 44/38* (2013.01);
(Continued)

(58) Field of Classification Search
None
See application file for complete search history.

(56) References Cited

U.S. PATENT DOCUMENTS 3,323,224 A   6/1967  Lough et al.
3,672,188 A   8/1972  Geschka et al.
(Continued)

FOREIGN PATENT DOCUMENTS

CN    1055335 A    10/1991
CN    1170061 A    1/1998
(Continued)

OTHER PUBLICATIONS

PCT Written Opinion of the International Searching Authority issued in International Patent Application No. PCT/KR2019/009500, dated Oct. 31, 2019, 8 pgs.
(Continued)

*Primary Examiner* — Cristi J Tate-Sims
(74) *Attorney, Agent, or Firm* — Birch, Stewart, Kolasch & Birch, LLP (57) ABSTRACT

The present disclosure relates to a clothing treating apparatus comprising: an outer case which includes a first opening formed at the front side thereof; an inner case which is provided inside the outer case and has a space formed therein to receive clothes; an inner case bottom surface which forms the bottom of the inner case; a first penetrating part which extends through the inner case bottom surface; and a first machinery room forming surface which forms a machinery room disposed under the inner case and separated from the inner case, and provides a holding surface that protrudes to enable a steam nozzle to be installed thereon.

15 Claims, 7 Drawing Sheets

(51) Int. Cl.

| | | |
|---|---|---|
| *B29C 44/38* | (2006.01) |
| *D06F 39/00* | (2020.01) |
| *D06F 58/12* | (2006.01) |
| *D06F 58/20* | (2006.01) |
| *D06F 58/24* | (2006.01) |
| *D06F 58/26* | (2006.01) |
| *D06F 87/00* | (2006.01) |
| *D06F 34/28* | (2020.01) |
| *B29C 44/18* | (2006.01) |
| *D06F 73/02* | (2006.01) |
| *D06F 39/12* | (2006.01) |
| *D06F 34/34* | (2020.01) |
| *D06F 39/14* | (2006.01) |
| *D06F 35/00* | (2006.01) |
| B29L 31/00 | (2006.01) |
| B29K 23/00 | (2006.01) |
| B29K 25/00 | (2006.01) |
| B29K 75/00 | (2006.01) |

(52) U.S. Cl.
CPC .............. *D06F 34/28* (2020.02); *D06F 34/34* (2020.02); *D06F 35/00* (2013.01); *D06F 39/008* (2013.01); *D06F 39/12* (2013.01); *D06F 39/14* (2013.01); *D06F 58/12* (2013.01); *D06F 58/20* (2013.01); *D06F 58/203* (2013.01); *D06F 58/24* (2013.01); *D06F 58/26* (2013.01); *D06F 73/02* (2013.01); *D06F 87/00* (2013.01); *B29K 2023/00* (2013.01); *B29K 2025/06* (2013.01); *B29K 2075/00* (2013.01); *B29K 2995/0015* (2013.01); *B29L 2031/762* (2013.01); *D06F 58/206* (2013.01)

(56) References Cited

U.S. PATENT DOCUMENTS

| | | | |
|---|---|---|---|
| 9,107,973 | B1 | 8/2015 | Robinson et al. |
| 11,236,939 | B1 | 2/2022 | Harikrishnasamy |
| 2004/0000175 | A1 | 1/2004 | Bolduan et al. |
| 2004/0041503 | A1 | 3/2004 | Lee |
| 2009/0151193 | A1 | 6/2009 | Moon et al. |
| 2009/0255141 | A1 | 10/2009 | Moon et al. |
| 2010/0058813 | A1 | 3/2010 | Moon et al. |
| 2010/0218566 | A1 | 9/2010 | Moon et al. |
| 2011/0016930 | A1* | 1/2011 | Moon ............... D06F 58/10 68/5 C |
| 2011/0168217 | A1 | 7/2011 | Neff et al. |
| 2012/0096734 | A1 | 4/2012 | Moon et al. |
| 2012/0160269 | A1 | 6/2012 | Pyo et al. |
| 2012/0235551 | A1 | 9/2012 | Park et al. |
| 2012/0240425 | A1* | 9/2012 | Park ............... D06F 58/203 68/6 |
| 2012/0247157 | A1 | 10/2012 | Park et al. |
| 2014/0238086 | A1 | 8/2014 | Choi et al. |
| 2014/0298865 | A1 | 10/2014 | Park et al. |
| 2015/0020419 | A1 | 1/2015 | Park et al. |
| 2016/0177500 | A1 | 6/2016 | Yoon et al. |
| 2019/0120546 | A1 | 4/2019 | Hong |

FOREIGN PATENT DOCUMENTS

| | | |
|---|---|---|
| CN | 2397169 Y | 9/2000 |
| CN | 1388350 A | 1/2003 |
| CN | 1456739 A | 11/2003 |
| CN | 1479066 A | 3/2004 |
| CN | 1896366 A | 1/2007 |
| CN | 101387071 A | 3/2009 |
| CN | 102016160 A | 4/2011 |
| CN | 101424037 B | 6/2011 |
| CN | 101812795 B | 8/2011 |
| CN | 102159760 A | 8/2011 |
| CN | 102388175 A | 3/2012 |
| CN | 102414361 A | 4/2012 |
| CN | 102656307 A | 9/2012 |
| CN | 102656312 A | 9/2012 |
| CN | 102679663 A | 9/2012 |
| CN | 103562458 A | 2/2014 |
| CN | 104321482 A | 1/2015 |
| CN | 104562600 A | 4/2015 |
| CN | 104846585 A | 8/2015 |
| CN | 204690363 U | 10/2015 |
| CN | 204825403 U | 12/2015 |
| CN | 205192057 U | 4/2016 |
| CN | 105714542 A | 6/2016 |
| CN | 106460301 A | 2/2017 |
| CN | 106467980 A | 3/2017 |
| CN | 206245092 U | 6/2017 |
| CN | 107142698 A | 9/2017 |
| CN | 207313967 U | 5/2018 |
| EP | 0 252 163 A1 | 1/1988 |
| EP | 0 324 589 A1 | 7/1989 |
| EP | 2514683 A1 | 10/2012 |
| EP | 2523989 | 11/2012 |
| EP | 2 594 690 A1 | 5/2013 |
| EP | 2883989 A1 | 6/2015 |
| EP | 3 321 414 A1 | 5/2018 |
| GB | 1252509 A | 11/1971 |
| GB | 2 111 142 A | 6/1983 |
| GB | 2511432 A | 9/2014 |
| JP | 48-43651 Y | 12/1973 |
| JP | 1-308597 A | 12/1988 |
| JP | 2-133787 A | 5/1990 |
| JP | 3-31273 U | 3/1991 |
| JP | 5-3876 U | 1/1993 |
| JP | 2000/225298 | 8/2000 |
| JP | 2006-506187 A | 2/2006 |
| JP | 2008-309372 A | 12/2008 |
| JP | 2009-291427 A | 12/2009 |
| JP | 2012-171 A | 1/2012 |
| JP | 2013/208248 | 10/2013 |
| JP | 2015-190716 A | 11/2015 |
| KR | 20-0206221 | 12/2000 |
| KR | 10-2009-0014444 A | 2/2009 |
| KR | 10-2009-0124147 A | 12/2009 |
| KR | 10-2010-0007342 | 1/2010 |
| KR | 10-2011-0067833 | 6/2011 |
| KR | 10-2012-0074557 | 7/2012 |
| KR | 10-2013-0015240 A | 2/2013 |
| KR | 10-2009-0102402 | 7/2014 |
| KR | 10-2014-0108454 | 9/2014 |
| KR | 10-2014-0120677 | 10/2014 |
| KR | 10-2015-0007055 | 1/2015 |
| KR | 10-2015-0085728 | 7/2015 |
| KR | 10-2018-0037459 | 4/2018 |
| KR | 10-2018-0052954 | 5/2018 |
| RU | 39604 U1 | 8/2004 |
| RU | 2467107 C1 | 11/2012 |
| RU | 2604312 C2 | 12/2016 |
| SU | 1707110 A1 | 1/1992 |
| WO | WO 2009/020328 A2 | 2/2009 |
| WO | WO 2009/064143 A3 | 5/2009 |
| WO | WO 2011/074853 | 6/2011 |
| WO | WO 2011/086076 A1 | 7/2011 |
| WO | WO 2014/108057 A1 | 7/2014 |
| WO | WO 2016/064251 | 4/2016 |

OTHER PUBLICATIONS

PCT Written Opinion of the International Searching Authority issued in International Patent Application No. PCT/KR2019/009478, dated Nov. 22, 2019, 6 pgs.

PCT Written Opinion of the International Searching Authority issued in International Patent Application No. PCT/KR2019/009498, dated Nov. 21, 2019, 6 pgs.

PCT Written Opinion of the International Searching Authority issued in International Patent Application No. PCT/KR2019/009499, dated Nov. 22, 2019, 7 pgs.

(56) References Cited

OTHER PUBLICATIONS

International Search Report and Written Opinion dated Oct. 31, 2019 in PCT/KR2019/009476 (6 pages).
Russian Notice of Allowance issued in Russian Application No. 2021103321, dated Jul. 5, 2021 (7 pages).
Indian Office Action issued in Indian Application No. 202117004656, dated Jul. 16, 2021 (7 pages).
Russian Notice of Allowance issued in Russian Application No. 2021104063, dated Aug. 10, 2021 (10 pages).
Russian Notice of Allowance issued in Russian Application No. 2021103392, dated Aug. 13, 2021 (14 pages).
Russian Notice of Allowance in Russian Application No. 2021103395, dated Aug. 13, 2021 (11 pages).
Notice of Allowance issued in Russian Application No. 2021104062, dated Aug. 19, 2021 (12 pages).

\* cited by examiner

CLOTHING TREATING APPARATUS

CROSS-REFERENCE TO RELATED APPLICATIONS

This application is a National Phase of PCT International Application No. PCT/KR2019/009476, filed on Jul. 30, 2019, which claims priority under 35 U.S.C. 119(a) to U.S. Provisional Application No. 62/711,629, filed on Jul. 30, 2018, the entire contents of all of which are hereby incorporated by reference.

TECHNICAL FIELD

The present disclosure relates to a laundry treating apparatus.

BACKGROUND

In general, a laundry treating apparatus refers to an apparatus capable of performing various operations related to laundry (washing, drying, deodorization, wrinkle removal, etc.). The laundry treating apparatus is a concept including a laundry machine configured to wash laundry, a dryer configured to dry wet laundry, and a refresher configured to remove odors or wrinkles from laundry.

Figure 1:
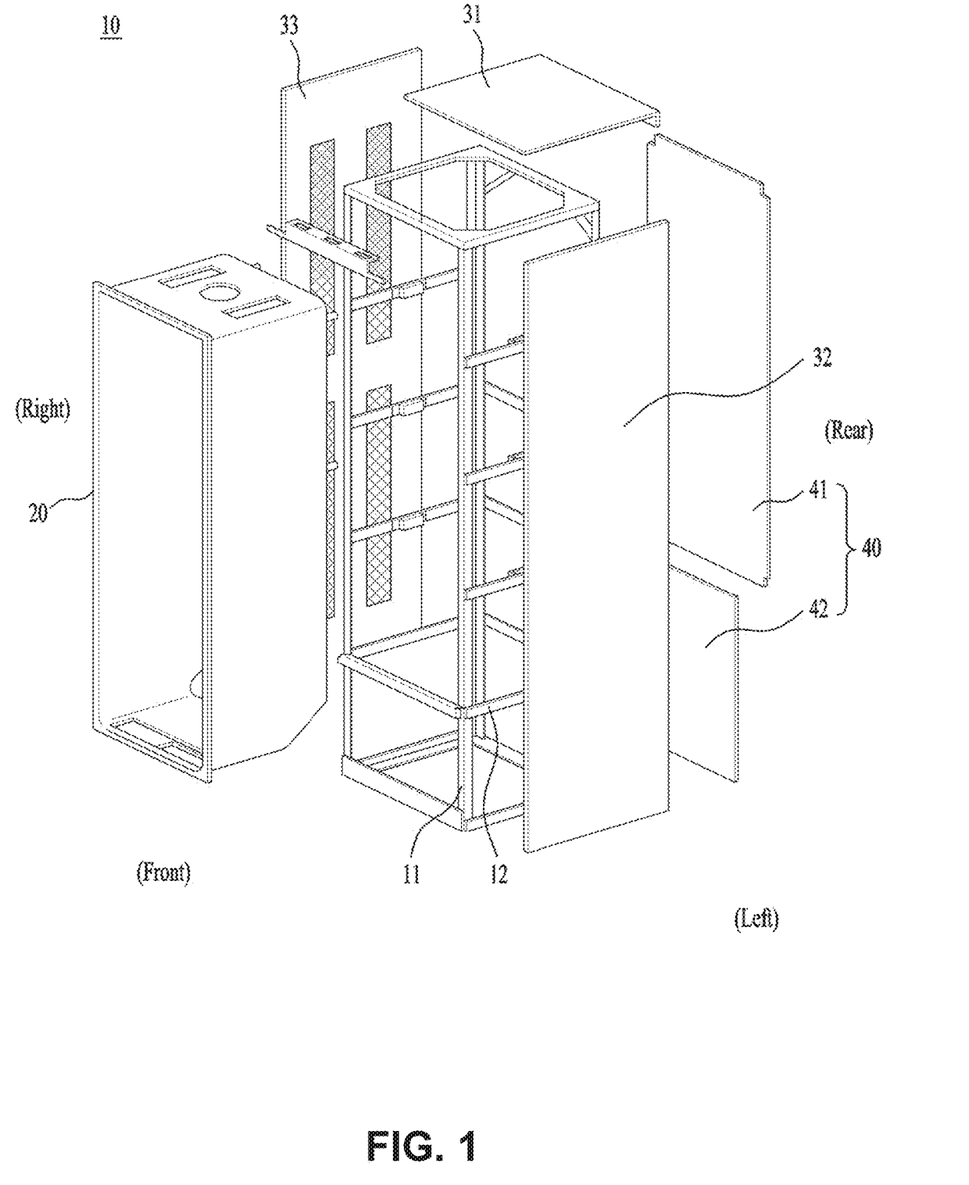
FIG. 1 shows the frames 11 and 12 of the conventional laundry treating apparatus.

In recent years, the laundry treating apparatus has been developed as a single device capable of carrying out all of washing, drying, deodorization, and wrinkle removal. FIG. 1 illustrates a laundry treating apparatus disclosed in Korean Patent Publication No. 10-2009-0124596. Referring to FIG. 1, the laundry treating apparatus includes an inner case 20 configured to provide a space for holding clothes, a hot air supplier (now shown) configured to supply hot air or water into the inner case 20 from the bottom of the inner case 20, and an outer case 31, 32, 33, and 40 disposed outside the inner case 20 and hot air supplier and configured to the external appearance thereof.

While storing clothes in the space provided by the inner case 20, the conventional laundry treating apparatus may deodorize the clothes and remove wrinkles from the clothes by providing hot air through the hot air supplier (not shown), which is disposed at the bottom of a cabinet, or compressing the clothes. In other words, since the laundry treating apparatus provides hot air or water while clothes spread out in the cabinet due to gravity, the laundry treating apparatus may deodorize the clothes and remove wrinkles therefrom without extra devices.

The conventional laundry treating apparatus further includes a frame 10 to fix the shapes of the inner case 20, hot air supplier, and cabinet and improve the durability thereof. The frame 10 may include a plurality of vertical frames 11 provided in the vertical direction and a plurality of horizontal frames 12 configured to couple the vertical frames 11 in the horizontal direction. Accordingly, the frame 10 may stably support the inner case 200 and effectively absorb vibrations generated in the hot air supplier (not shown).

However, there has been some difficulties in manufacturing the laundry treating apparatus. The vertical frames 11 need to be coupled to the horizontal frames 12, the inner case 20 and hot air supplier need to be fixed to the frame 10, and the outer case 31, 32, 33, and 40 needs to be coupled to the frame 10. In particular, when the cabinet is disposed on the top surface 31, the side surfaces 32 and 33, and the rear surface 40, each of these components need to be coupled to the frame 10

In addition, when the inner case 20 is coupled to the outer case 31, 32, 33, and 40 as well as when the frame 10 is assembled, coupling members, for example, 120 or more volts and nuts are required.

As a result, the following problems have arisen. The manufacturing of the laundry treating apparatus is time-consuming. Also, if a specific coupling member is not completely coupled or omitted, the durability of the laundry treating apparatus is not guaranteed, that is, the defect rate increases.

To solve the above problems, it has been considered that frames are replaced with foamed plastics. To this end, a foaming space to be filled with the foamed plastics needs to be provided between an inner case 120 (see FIG. 2A) and an outer case 110 (see FIG. 2A), which will be described later. Thus, before foaming, the inner case 120 (see FIG. 2A) and the outer case 110 (see FIG. 2A) need to be coupled to each other, and all holes need to be blocked in order to prevent the foamed plastics from flowing thereinto. In addition, components that need to be installed between a machine room 200 (see FIG. 2B) and the inner case 120 (see FIG. 2A) or between the inner case 120 (see FIG. 2A) and the outer case 110 (see FIG. 2A) may be preassembled before foam molding. Herein, assembly before injection of the foamed plastics is referred to as preassembly. For example, a first through portion 1211 (see FIG. 3), which is provided on the inner case 120 (see FIG. 2A) to provide steam into the inner case 120 (see FIG. 2A), and a steam nozzle 260, which is connected to the first through portion 1211 (see FIG. 3) and configured to provide steam, may be preassembled.

When the machine room 200 (see FIG. 2B) is designed to be located at the bottom of the inner case 120 (see FIG. 2A), a space for installing components so-called "machine room" needs to be provided. To this end, a machine room forming portion 300 (see FIG. 2A) needs to be provided to install the machine room 200 (see FIG. 2B) therein. To prevent the machine room forming portion 300 (see FIG. 2A) from being deformed by foaming pressure or from being changed unexpectedly during hardening of the foamed plastics, a mold, a jig, etc. may be inserted so that the machine room 200 (see FIG. 2B) may act as a secondary supporter (not shown). When the steam nozzle 260 of the machine room forming portion 300 is preassembled, a supply pipe for providing steam may be inserted into the machine room forming portion 300 and protrude therefrom. In this case, there may be interference between the steam nozzle 260 and the secondary supporter (not shown). As a result, the steam nozzle 260 may be deformed, or the secondary supporter (not shown) may not be inserted.

Technical Problem

One object of the present disclosure is to provide a laundry treating apparatus including a machine room forming portion for preventing interference between a mold or jig and a preassembled steam nozzle in foam molding with foamed plastics. Another object of the present disclosure is to provide a laundry treating apparatus including a steam nozzle that is preassembled before foaming to prevent foamed plastics from leaking. Still another object of the present disclosure is to provide a laundry treating apparatus with one integrated sealing structure in order to simplify preassembly and prevent leakage of steam and foamed plastics. A further object of the present disclosure is to provide a laundry treating apparatus including a machine room forming portion that provides a structure for mounting a steam nozzle and strength therefor when the steam nozzle is preassembled.

Technical Solution

To achieve these objects and other advantages and in accordance with the purpose of the disclosure, a laundry treating apparatus for preventing leakage of steam and foamed plastics is provided. The laundry treating apparatus may have a single sealing structure by simplifying the structure of a steam nozzle. Specifically, the steam nozzle may be located between the bottom surface of an inner case and a machine room forming portion so that the sealing structure provided in the steam nozzle may prevent the foamed plastics from leaking into the inner case. In addition, a mounting surface of the machine room forming portion, where the steam nozzle is located, may protrude or elevate, compared to other surfaces. Thus, the inserted length of a steam inlet and a condensate water outlet formed in the body of the steam nozzle may cause no interference to a mold or zig, which is inserted into the machine room forming portion before foaming.

In one aspect of the present disclosure, a laundry treating apparatus is provided. The laundry treating apparatus may include: an outer case having a first opening the first opening formed by opening a front side of the outer case; an inner case provided inside the outer case and defining a space for holding clothes; an inner case bottom surface defining a floor of the inner case; a first through portion penetrating the inner case bottom surface; a machine room forming portion located below the inner case and defining a machine room separated from the inner case, wherein the machine room forming portion may include a first machine room forming surface located below the inner case bottom surface, a mounting surface elevated toward the inner case bottom surface from the first machine room forming surface, and a mounting surface through hole penetrating the mounting surface; a steam generator provided in the machine room and configured to generate steam; and a steam nozzle including a nozzle body located between the first through portion and the mounting surface through hole, a supply pipe configured to provide the steam generated by the steam generator into the nozzle body, wherein a first end of the supply pipe is coupled to the nozzle body and a second end thereof is inserted into the mounting surface through hole, a steam discharger configured to discharge the steam in the nozzle body into the inner case.

The mounting surface through hole may include a first mounting surface through hole and a second mounting surface through hole. The nozzle body may include: a first body mounted in the first through portion and including the steam discharger configured to discharge the steam into the inner case; and a second body coupled to the mounting surface and including the supply pipe.

The laundry treating apparatus may further include: a first foaming space formed between a top portion of the inner case and a top portion of the outer case; a second foaming space formed between a side surface of the inner case and a side surface of the outer case; a third foaming space formed between a top portion of the machine room forming portion and a bottom surface of the outer case; and foamed plastics configured to fill the third foaming space. The first and second bodies may be assembled with the inner case and the machine room forming portion before injection of the foamed plastics and configured to prevent the foamed plastics from leaking through the first mounting surface through hole, the second mounting surface through hole, and the first through portion during the injection of the foamed plastics.

After assembly of the steam nozzle with the first through portion and the mounting surface, an inserted length of the steam inlet inserted into the mounting surface through the first mounting surface through hole and an inserted length of the condensate water outlet inserted into the mounting surface through the second mounting surface through hole may be smaller than an elevated length of the mounting surface elevated from the first machine room forming surface.

The outer case may further include a second opening. The laundry treating apparatus may further include a rear panel coupled to the second opening and defining a rear surface of the outer case. The rear panel may include a first rear panel coupled to the second opening and defining a rear surface at a position corresponding to the inner case and a second rear panel coupled to the second opening and defining a rear surface at a position corresponding to the machine room forming portion.

The mounting surface may include a part of a first edge in parallel to the rear panel on the first machine room forming surface. The first edge may include a first forming portion flange formed by bending and extending.

The first through portion may include: a first through hole penetrated by a recess of the inner case bottom surface toward the machine room forming portion; and a guider configured to couple an edge of the first through hole and the inner case bottom surface. The guider may include: a first guider coupled to the inner case bottom surface with an inclination; and a second guider extending from the first guider toward the first through hole in parallel to the inner case bottom surface.

The first body may include: a first nozzle surface for mounting on the second guider; the steam discharger located on the first nozzle surface and configured to discharge the steam; and a first body partition protruding from the first nozzle surface and surrounding the steam discharger, wherein the first body partition is inserted into the first through hole. The second body may include: a second nozzle surface, wherein the condensate water outlet and the steam inlet are located on the second nozzle surface; a nozzle side surface extending from the second nozzle surface and defining a side surface of the second body to define a steam storage space for storing the steam inside the second body; a second body partition extending from the nozzle side surface and in contact with the second guider, wherein the first body partition is inserted into the second body partition; and a third body partition defining a sealing space together with the second body partition and the second guider, wherein the third body partition vertically protrudes from the nozzle side surface and bends. A sealing member may be inserted into the sealing space to prevent the foamed plastics and the steam from leaking.

The steam inlet may include: a steam inlet body penetrating the second nozzle surface and protruding toward the steam storage space; and a steam vent configured to discharge the steam into the steam storage space. The steam vent may be provided toward the condensate water outlet so that when the steam is discharged into the steam storage space, the steam flowing along the steam inlet body may change a flow direction at an end of the steam inlet body.

The second nozzle surface may be inclined downward toward the condensate water outlet. The inner case bottom surface may further include: an air supplier configured to supply air to the inner case; and an air discharger provided toward the first opening and configured to discharge the air in the inner case. The inner case bottom surface may be inclined toward the air discharger.

The foamed plastics may be any one of polyurethane, polystyrene, and polyolefin.

Advantageous Effects

As is apparent from the above description, the present disclosure has effects as follows. There may be no interference from a mold or zig inserted into a machine room even when a steam nozzle is preassembled before foaming. The steam nozzle may be preassembled and installed stably. A sealing structure for preventing leakage of foaming agents and stem may be simplified. The number of components or processes may be reduced, thereby reducing manufacturing cost. A reinforcing portion may be provided to compensate for weakness caused when foamed plastics are used between inner and outer cases instead of frames. The reinforcing portion may be commonly installed regardless of left or right. The durability of products may be improved, thereby increasing the reliability of products.

DETAILED DESCRIPTION

Hereinafter, exemplary embodiments of the present disclosure will be described in detail with reference to the accompanying drawings. The configuration of an apparatus or a control method of the apparatus, which will be described below, is merely given to describe the embodiments of the present disclosure but not intended to limit the scope of the present disclosure. The same reference numerals used throughout the specification refer to the same constituent elements.

Certain terminology is used herein for convenience only and is not to be taken as a limitation on the embodiments described. For example, expressions indicating a relative or absolute arrangement such as "in a certain direction", "along a certain direction", "parallel to", "orthogonal to", "center of", "concentric to", and "coaxially" do not only strictly indicate such arrangements but also indicate a state including a tolerance or a relative displacement within an angle and a distance achieving the same function.

For example, expressions indicating a state where the objects are the same such as "the same", "equal to", and "equivalent to" do not only strictly indicate the same state but also indicate a state including a tolerance or a difference achieving the same function.

For example, expressions indicating shapes such as rectangular and cylindrical do not only indicate the shapes such as rectangular and cylindrical in a geometrically strict sense, but also indicate shapes including recesses/protrusions, chamfered portions, and the like, as long as the same effect can be obtained.

Expressions such as "comprising", "including", "includes", "provided with", or "having" a certain component are not exclusive expressions that exclude other components.

For the sake of brief description with reference to the drawings, the same or equivalent components may be provided with the same or similar reference numbers, and description thereof will not be repeated.

A structure applied to one embodiment may be equally applied to another embodiment unless there is any contradiction structurally and functionally.

A singular representation may include a plural representation unless it represents a definitely different meaning from the context.

In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

As described above, the conventional laundry treating apparatus using the frames 11 and 12 has the following problems. The manufacturing of the laundry treating apparatus is time-consuming. If a specific coupling member is not completely coupled or omitted, the durability of the laundry treating apparatus is not guaranteed. That is, the defect rate increases.

To solve the above problems, the frames 11 and 12 may be replaced with foamed plastics. The foamed plastics are polymer materials with foam or porous structures, which are obtained by generating gases using a foaming agent. Further, the foamed plastic may mean an inhomogeneous suspension of solid polymer materials and gases.

The foamed plastics are widely used as functional composites in various products due to their low weight, high impact absorption, high sound insulation, high heat insulation, etc. Any one of polyurethane, polystyrene, and polyolefin may be used as the raw polymer material of the foamed plastics. In addition to that, phenolic resin, polyvinyl chloride, urea resin, silicon, polyimide, and melamine resin may be foamed and used.

In particular, polyurethanes are polymers composed of a soft segment consisting of polyols and a hard segment generated by reaction with diisocyanates. The properties of a segmented polyurethane polymer vary depending on the types of raw materials and composite methods so that the polyurethane polymer may be used for various purposes. Particularly, the combination of isocyanates and hydroxyl groups is defined as a urethane combination, and the polyurethanes are coupling of multiple urethane combinations. If urethane combinations are selectively created under various conditions, polyurethanes with high elasticity, polyurethanes as soft as rubber, polyurethanes as stiff as wood, etc. may be made, and the characteristics thereof may be controlled as desired.

The polyurethanes have been widely used as insulators and, more particularly, as foamed materials for energy saving. Recently, the polyurethanes have also been widely used as insulators in electric and electronic products.

Polyurethane foam is composed of a solid polymer and a foaming gas. As the reaction temperature increases during the polyurethane synthesis reaction, the foaming gas evaporates and is placed in a cell in the foam, whereby the foaming gas partially acts as a thermal barrier.

Foaming agents mixed into a polyurethane polymer to change the polyurethane polymer into a foamed polyurethane polymer may be divided into chemical foaming agents and physical foaming agents. The chemical foaming agent forms bubbles by chemical reactions, and the physical foaming agent forms bubbles by the physical state change of a compression gas or the state change (evaporation) of a liquid.

For example, when the chemical foaming agent is used, water molecules and isocyanates react to form unstable carbonic acid, which is decomposed into amine and carbon dioxide. The amine reacts again with the rest of the isocyanates to form urea bonds, and the carbon dioxide forms new bubbles in the polymer. The resulting gas grows existing bubbles and, at the same time, creates new bubbles. However, this is merely exemplary, and various foaming agents may be used depending on the purpose.

For foam molding, the preassembled laundry treating apparatus 100 may be put into a prepared foaming mold or foaming jig, and then foamed plastics may be injected into inlets 1411 to 1416 disposed on the laundry treating apparatus 100.

Since the foamed plastics are in a liquid state before the injection, the foamed plastics may harden during the foam molding after being injected through the inlets 1411 to 1416. A foaming agent may be injected as when the foaming agent is in the liquid state. Thus, it is important to prevent the foamed plastics from leaking.

The inlets 1411 to 1416 may be disposed on a rear panel portion 140, which is provided at the rear of the laundry treating apparatus 100.

The foamed plastics enters foaming spaces 921 to 925 (see FIG. 2B) through the inlets 1411 to 1416. In other words, the foaming spaces 921 to 925 are filled with the foamed plastics. Air in the foaming space or gases generated during the foaming may be discharged through a gas outlet 1419. The reason for this is to prevent that the foamed plastics do not completely fill the foaming spaces 921 to 925 (see FIG. 2B) due to residual gases or that the inner case 120, outer case 110, or machine room forming portion 300 is deformed by foaming pressure.

If there is a crack in the laundry treating apparatus 100, the foamed plastics may leak from the crack. This may be interpreted to mean that the foamed plastics flow into other spaces rather than the foaming spaces 921 to 925 (see FIG. 2B). To avoid the leakage, all cracks and holes need to be filled up by preassembling the laundry treating apparatus 100 before the foam molding.

Figure 2A:
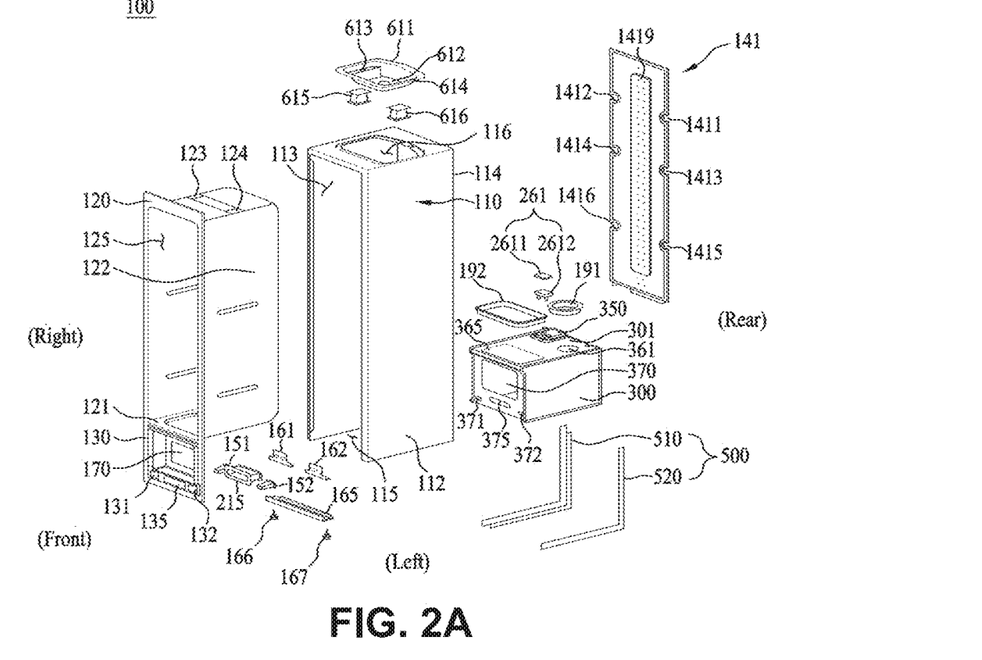
FIG. 2A is an exploded view of a laundry treating apparatus preassembled before foam molding according to an embodiment of the present disclosure.

FIG. 2A is an exploded view of components that need to be preassembled to define the foaming spaces and avoid the leakage before the preassembled laundry treating apparatus is put into the foaming mold or foaming jig for the injection of the foamed plastics.

Referring to FIG. 2A, the outer case 110 and the inner case 120 may be assembled. The outer case 110 may include a first opening 113 having an opening at the front thereof, a second opening 114 having an opening at the rear thereof, a third opening 115 having an opening at the bottom thereof, and a fourth opening 116 having a partial opening at the top thereof. The inner case 120 may be disposed inside the outer case 110 and define a space 125 for holding clothes.

A moving hanger installation body 611 for installing a moving hanger may be installed in the fourth opening 116 of the outer case 110. The moving hanger installation body 611 may include a driver installation hole 612 for installing a driver of the moving hanger and coupling portion insertion holes 613 and 614 into which a coupling portion for coupling a moving hanger bar is inserted.

In addition, inner case through holes 123 and 124, which are connected to the coupling portion insertion holes 613 and 614, may be defined at the top of the inner case 120.

The driver installation hole 612 may require a cover (not shown) for blocking the hole to form a first foaming space 921, which is defined between the top of the inner case 120 and the top of the outer case 110 and filled with the foamed plastics. Thus, there may be no leakage even when the foamed plastics are injected into the first foaming space 921 (see FIG. 2B).

A tank installation portion 130 for installing a water supply and drain tank (not shown) may be disposed at the bottom of the inner case 120. The water supply and drain tank may be configured to store water for steam generation and drain condensate water. The tank installation portion 130 may be integrated with the inner case 120 or provided separately from the inner case 120. A door (not shown), which is rotatably and movably coupled to the outer case 110 and configured to open and close the front of the inner case 120, may be installed at the bottom of the tank installation portion 130. The door may be rotatably and movably coupled to the left or right side of the outer case 110 depending on a user selection. That is, the door may be coupled to either the right or left side. Such a door is referred to as a reversible door.

Wire paths may be required for control signal exchange between a display (not shown) and multiple sensors (not shown), which are disposed on the door, and a controller (not shown) disposed on the machine room 200. To this end, a first tank installation portion through hole 131 and a second tank installation portion through hole 132 may be defined at the bottom of the tank installation portion 130. The first tank installation portion through hole 131 is coupled to a first coupling body 151, and the first coupling body 151 is coupled to a fourth forming portion through hole 371 of the machine room forming portion 300, which will be described later, thereby forming an enclosed wire path.

Similarly, the second tank installation portion through hole 132 is coupled to a second coupling body 152, and the second coupling body 152 is coupled to a fifth forming portion through hole 372 of the machine room forming portion 300, which will be described later, thereby forming an enclosed wire path. These enclosed paths may prevent the leakage of the foamed plastics even when the foamed plastics are injected into the machine room forming portion 300 and tank installation portion 130.

Since the wire paths may change depending on whether the door is coupled to the right or left, it needs to be considered in the design.

A machine room through hole 170 connected to the machine room 200 may be defined in the tank installation portion 130. A water supply and drain pipe or valve of the water supply and drain tank may be connected to the inside of the machine room 200 through a third forming portion through hole 370 of the machine room forming portion 300. Thus, covers for sealing the machine room through hole 170 and third forming portion through hole 370 may be required to prevent the leakage of the foamed plastics.

A third tank installation portion through hole 135 configured to flow external air into an heat exchanger 220 in the machine room 200 may be provided at the bottom of the tank installation portion 130. The third tank installation portion through hole 135 may be coupled to a third inlet duct 215, and the third inlet duct 215 may be coupled to a sixth forming portion through hole 375 of the machine room forming portion 300, which will be described later, thereby forming an sealed path for drawing external air. The third inlet duct 215 may prevent the leakage of the foamed plastics even when the foamed plastics are injected into the machine room forming portion 300 and tank installation portion 130.

A leg fixing portion 165 may be provided at the front of the third opening 115 defined on the bottom of the outer case 110. The leg fixing portion 165 may be in contact with the bottom of the tank installation portion 130 and coupled to a first screw 166 and a second screw 167 for placing the laundry treating apparatus 100 in parallel to the ground. A first bracket 161 and a second bracket 162 may be used to couple the leg fixing portion 165 to the bottom of the tank installation portion 130.

Thus, a space between the machine room forming portion 300 and the tank installation portion 130 are all enclosed by the leg fixing portion 165, the first coupling body 151, the second coupling body 152, the third inlet duct 215, and the covers of the machine room through hole 170 and third forming portion through hole 370. That is, the enclosed space may form a fifth foaming space 925 (see FIG. 2B) where the foamed plastics are foamed. The fifth foaming space 925 (see FIG. 2B) may prevent the leakage of the foamed plastics during the injection of the foamed plastics.

A second foaming space 922 (see FIG. 2B), where the foamed plastics are injected and foamed, may be provided between a side surface 122 of the inner case 120 and a side surface 112 of the outer case 110. In addition, a fourth foaming space 924 (see FIG. 2B), where the foamed plastics are injected and foamed, may be provided between a side surface 320 of the machine room forming portion 300 and the side surface 112 of the outer case 110.

The inner case 120 may include the space 125 for holding clothes. The first through portion 1211 (see FIG. 3), which is connected to the machine room 300 and configured to provide steam into the inner case 120, may be defined on a bottom surface 121 of the inner case 120. Also, a second through portion 1212 (see FIG. 3), which is configured to provide air into the inner case 120 may be defined on the bottom surface 121 of the inner case 120. Further, a third through portion 1213 (see FIG. 3), which is configured to discharge air to the machine room 300, may be defined on the bottom surface 121 of the inner case 120. The bottom surface 121 (see FIG. 3) may be inclined in the direction of the third through portion 1213 so that condensed steam may be discharged.

Since the steam nozzle 260 is disposed between the first through portion 1211 (see FIG. 3) and a mounting surface 350 of the machine room forming portion 300, it is possible to prevent leakage through a first mounting surface through hole 351 (see FIG. 5) and a second mounting surface through hole 352 (see FIG. 5), which are defined between the first through portion 1211 (see FIG. 3) and the mounting surface 350.

A first rotation coupling body 191 may be provided between the second through portion 1212 (see FIG. 3) and a first forming portion through hole 361, and a second rotation coupling body 192 may be provided between the third through portion 1213, (see FIG. 3) and a second forming portion through hole 362. Thus, a third foaming space 923, which is provided between the top surface of the machine room forming portion 300 (i.e., a first machine room forming surface 310) and the bottom surface 121 of the inner case 120, is sealed. The sealing of the third foaming space 923 may prevent the leakage of the foamed plastics.

The forming spaces, which are defined between the outer case 110 and inner case 120, between the outer case 110 and machine room forming portion 300, between the inner case 120 and machine room forming portion 300, may be filled with the foamed plastics. All of the foaming spaces may be integrated.

In other words, the first foaming space 921 (see FIG. 2B), second foaming space 922 (see FIG. 2B), third foaming space 923 (see FIG. 2B), fourth foaming space 924 (see FIG. 2B), and fifth foaming space 925 (see FIG. 2B) may be connected to each other. Thus, when the foamed plastics are injected through the inlets 1411 to 1416 disposed on a first rear panel 141, the foamed plastics may flow into and fill in all of the foaming spaces.

Before the injection of the foamed plastics, a reinforcing portion 500 may be installed between each side surface 320 of the machine room forming portion 300 and each side surface 112 of the outer case 110. The reinforcing portion 500 is provided to prevent the outer case 110 from being deformed when the bottom of the outer case 110 becomes weak.

The reinforcing portion 500 is an L-shape bracket. That is, the reinforcing portion 500 is coupled to a rear portion of the side surface of 112 of the outer case 110, which is coupled to a second rear panel 142, and a bottom portion of the side surface 112 of the outer case 110, which is coupled to a base 190 that forms the floor of the laundry treating apparatus 100. A length L2 of the reinforcing portion 500 coupled to the rear portion of the side surface of 112 of the outer case 110, which is coupled to the second rear panel 142, may be the same as the length L1 of the reinforcing portion 500 coupled to the bottom portion of the side surface 112 of the outer case 110, which is coupled to the base 190 that forms the floor of the laundry treating apparatus 100. Accordingly, the reinforcing portion 500 may be commonly installed on two side surfaces.

The reinforcing portion 500 may include a first bracket 510 and a second bracket 520 installed on the two side surfaces 112 of the outer case 110. Each bracket may be coupled to any one side surface 112 of the outer case 110 as described above.

Figure 2B:
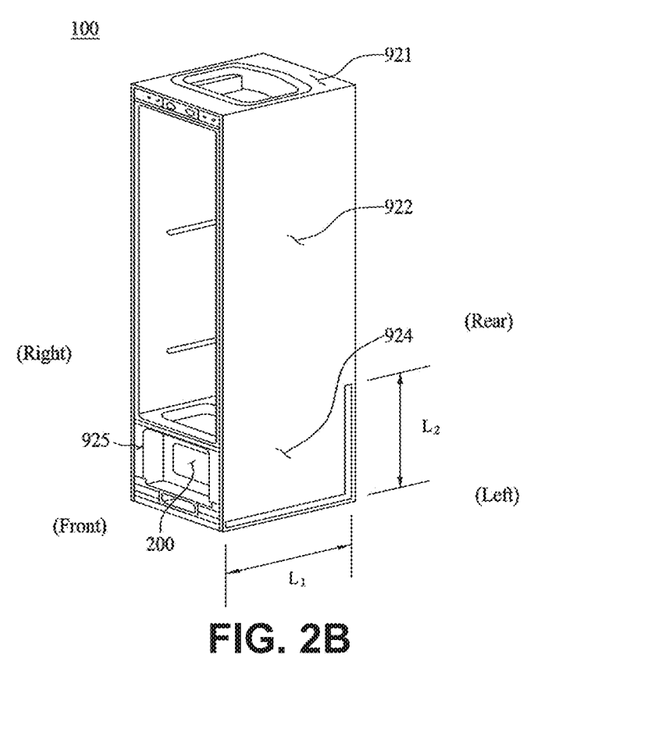
FIG. 2B shows the laundry treating apparatus after the foam molding viewed from the front thereof.

FIG. 2(*b*) shows that the components shown in FIG. 2A are preassembled. Although the reinforcing portion 500 is invisible after assembly, FIG. 2B shows the reinforcing portion 500 to indicate the location thereof.

The foamed plastics including a foaming material (agent) are injected through the inlets 1411 to 1416 disposed on the first rear panel 141, which is provided at the rear of the preassembled laundry treating apparatus 100, and residual gases are discharged through the gas outlet 1419 on the first rear panel 141.

Figure 3:
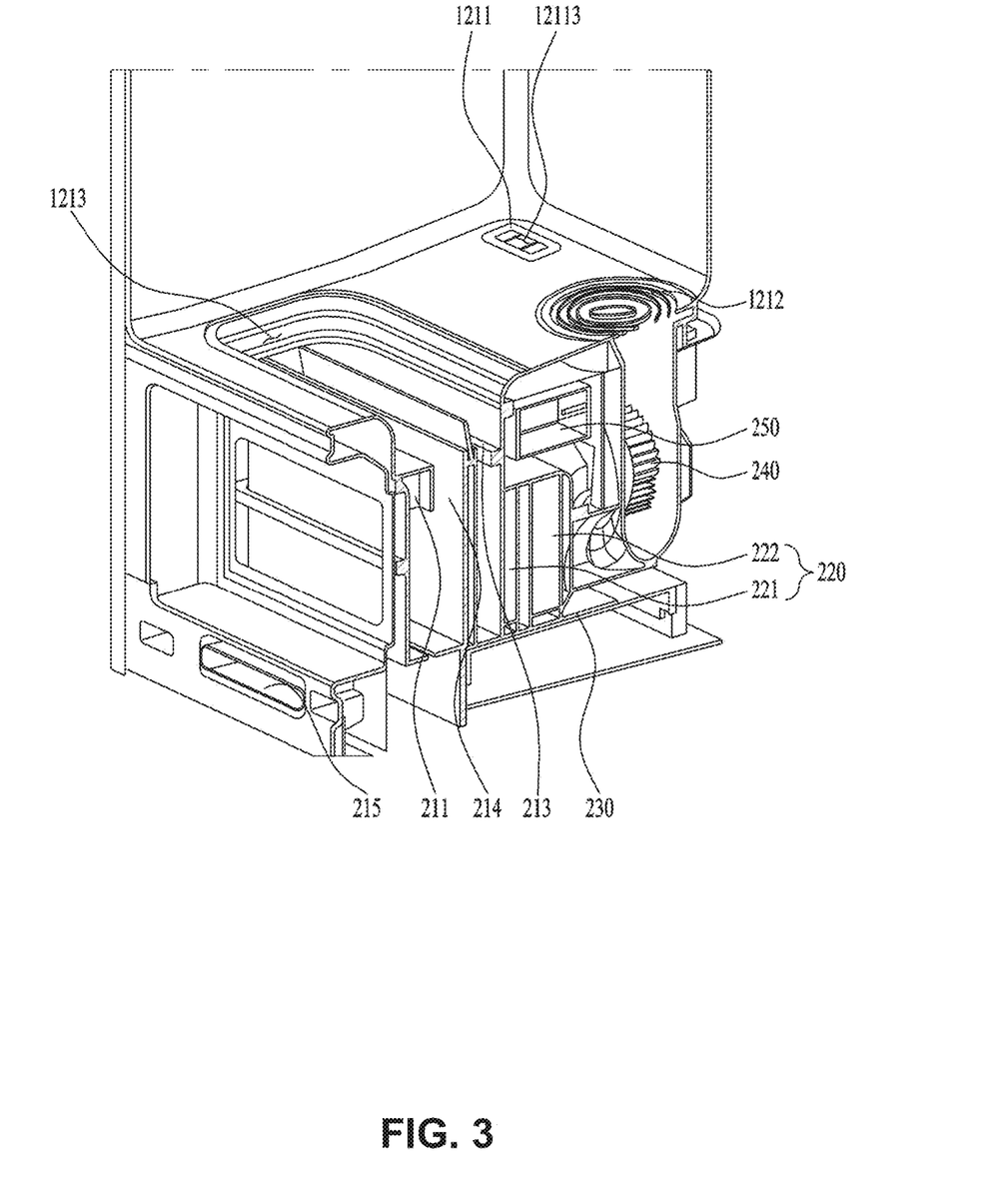
FIG. 3 shows a heat exchanger 220 and a steam generator 250 installed in the machine room 200 and a first through portion 1211 provided in the inner case 120.

FIG. 3 shows a cross-section of the inner case 120 and machine room 200. In FIG. 3, inlet ducts 211, 212, and 215 configured to provide air into the inner case 120, the heat exchanger 220 including an evaporator 221 and a condenser 222, a steam generator 250 configured to provide steam are illustrated. In addition, the first through portion 1211 provided at the bottom surface 121 of the inner case 120 and configured to provide steam, the second through portion 1212 configured to provide air, and the third through portion 1213 configured to discharge air or steam to the machine room 200 are illustrated. The steam generator 250 may include a heater and provide steam into the inner case 120 through the steam nozzle 260 (see FIG. 2A) by vaporizing water supplied from the water supply tank (not shown).

Figure 4:
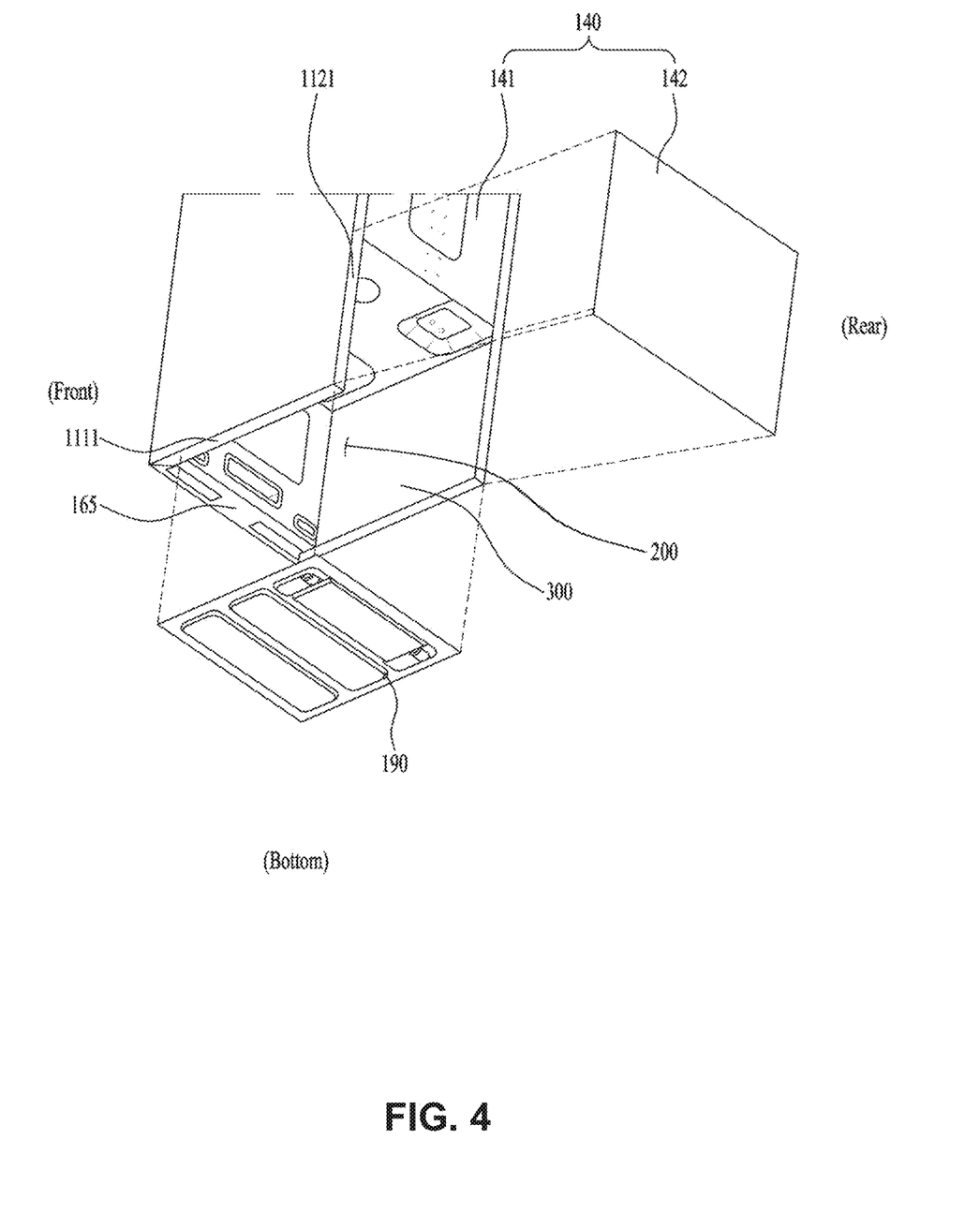
FIG. 4 shows a second rear panel 142 and a base 190 disassembled from the laundry treating apparatus.

FIG. 4 is a view of the preassembled laundry treating apparatus viewed from the rear and bottom thereof. The base 190 may be coupled to the two side surfaces 112 of the outer case 110 in the direction of the third opening 115 of the outer case 110. The base 190 may define the floor of the laundry treating apparatus 100. A first outer case flange 1111 may extend from two edges facing in the direction of the third opening 115 on the two side surfaces 112 of the outer case 110. The first outer case flange 1111 may be coupled to a fifth forming portion flange 3255 of the machine room forming portion 300, which will be described later.

The first rear panel 141 may be coupled to the outer case 110 in the direction of the second opening 114, and the second rear panel 142 may be disposed at a location corresponding to that of the machine room forming portion 300. The rear panels 141 and 142 may define the rear surface of the outer case 110. A second outer case flange 1121 may extend from two edges facing in the direction of the second opening 114 on the two side surfaces 112 of the outer case 110. The second outer case flange 1121 may be coupled to a fourth forming portion flange 3244 of the machine room forming portion 300, which will be described later.

Figure 5A:
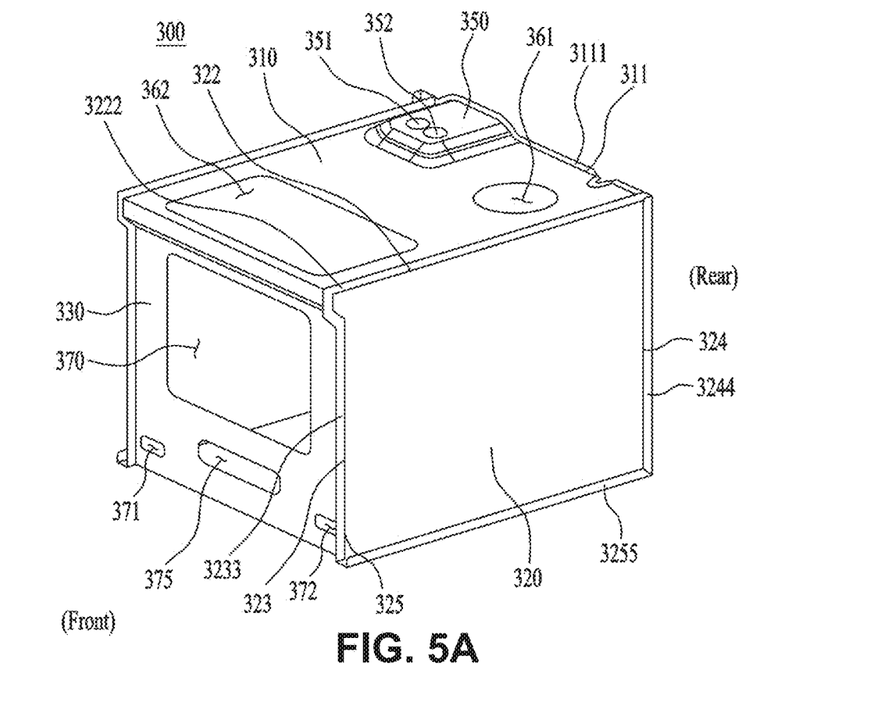
FIG. 5A is a view of a machine room forming portion 300 viewed from the front thereof.
Figure 5B:
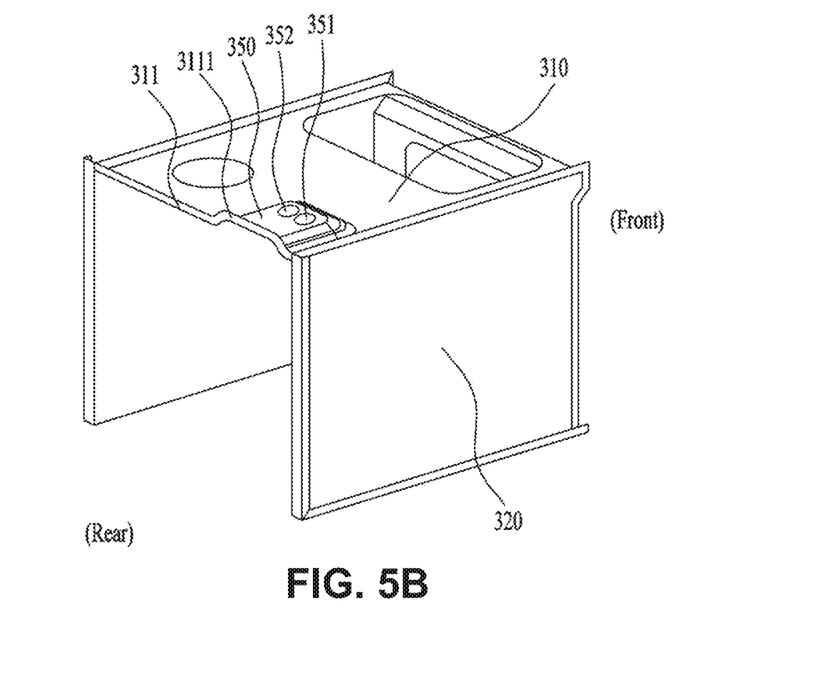
FIG. 5B is a view of the machine room forming portion 300 viewed from the rear thereof.

FIG. 5 shows the machine room forming portion 300 provided at the bottom of the inner case 120. Specifically, FIG. 5A is a view of the machine room forming portion 300 viewed from the front thereof, and FIG. 5B is a view of the machine room forming portion 300 viewed from the rear thereof. The machine room forming portion 300 is preassembled before the foam molding. The reason for this is to provide a space so-called "machine room" after the foam molding. The machine room forming portion 300 is opened in the directions of the second opening 114 and third opening 115 of the outer case 110. The first machine room forming surface 310 defining the top surface may include the mounting surface 350, first forming portion through hole 361, and second forming portion through hole 362. The machine room forming portion 300 may further include second machine room forming surfaces 320 defining two side surfaces, the third forming portion through hole 370 defining the front surface of the machine room forming portion 300 and connected to the tank installation portion 130, and a third machine room forming surface 330 including the fourth forming portion through hole 371, fifth forming portion through hole 372, and sixth forming portion through hole 375.

As described above, the first rotation coupling body 191 may be coupled to the first forming portion through hole 361 penetrating the first machine room forming surface 310, and the second rotation coupling body 192 may be coupled to the second forming portion through hole 362 penetrating the first machine room forming surface 310. Thus, it is possible to prevent the foamed plastics from leaking from the third foaming space 923 through the through holes on first machine room forming surface 310.

The water supply and drain pipe or valve of the water supply and drain tank may be connected to the inside of the machine room 200 through the third forming portion through hole 370 penetrating the third machine room forming surface 330. Thus, the cover for sealing the machine room through hole 170 may be required to prevent the leakage of the foamed plastics.

To form wire paths, the fourth forming portion through hole 371 and fifth forming portion through hole 372 penetrating the third machine room forming surface 330 may be connected to the first coupling body 151 and second coupling body 152, respectively. These connections may prevent leakage from the fifth foaming space 925 to the machine room forming portion 300.

The sixth forming portion through hole 375 penetrating the third machine room forming surface 330 may configured to draw external air through the connection with the third inlet duct 215 and perform dehumidification through the heat exchanger 220. The third inlet duct 215 may prevent leakage from the fifth foaming space 925 to the machine room forming portion 300.

The first machine room forming surface 310 may include a first edge, which is an edge placed in the direction of the second opening 114 of the outer case 110 and second edges 322, which are two edges in contact with the second machine room forming surfaces 320.

The second machine room forming surfaces 320 defining the two side surfaces of the machine room forming portion 300 may include the second edges 322, a third edge 323 in contact with the third machine room forming surface 330, a fourth edge 324 placed in the direction of the second opening 114, and a fifth edge 325 in contact with the base 190 and placed in the direction of the third opening 115. The reinforcing portion 500 may be provided between each of the second machine room forming surfaces 320 and the outer case 110.

A part of the first machine room forming surface 310 including the first edge 311 may be elevated toward the bottom surface 121 of the inner case 120 so as to form the mounting surface 350. The elevated length of the mounting surface 350 from the first machine room forming surface 310 may be smaller than the height of the third foaming space 923 where the mounting surface 350 is placed, that is, the distance between the bottom surface 121 of the inner case 120 and the first machine room forming surface 310. Accordingly, when the machine room forming portion 300 is preassembled with the bottom of the inner case 120, the machine room forming portion 300 may not be interference by the mounting surface 350.

Further, the preassembled steam nozzle 260 may prevent the elevation of the mounting surface 350 from being interfered by the mold or zig (not shown) inserted into the machine room forming portion 300 during the foaming.

To prevent the machine room forming portion 300 (see FIG. 2A) from being deformed by the foaming pressure during the foam molding or from being changed unexpectedly during the hardening of the foamed plastics, an intermediate mold, an intermediate jig, etc. may be inserted so that the machine room 200 (see FIG. 2B) may act as the secondary supporter (not shown). In this case, the insertion of the intermediate mold or zig may be disturbed by a steam inlet 2641 and a condensate water outlet 2645 disposed in the steam nozzle 260, which are illustrated in FIG. 7. To avoid this problem, the inserted length (IL) of the steam inlet 2641 and condensate water outlet 2645 may be designed to be smaller than the elevated length (EL) of the mounting surface 350.

The mounting surface 350 may include first mounting surface through hole 351 into which the steam inlet 2641 is inserted and the second mounting surface through hole 352 in to which the condensate water outlet 2645 is inserted. A mounting surface protruding portion 355 (see FIG. 6B) may be defined on the first mounting surface through hole 351 and second mounting surface through hole 352 such that the first mounting surface through hole 351 and second mounting surface through hole 352 protrude toward the inner case 120. The mounting surface 350 may be coupled to the first machine room forming surface 310 along the inclined surface.

A part of the first edge 311 may also be elevated when the mounting surface 350 is elevated. The entirety of the first edge 311 including the elevated part may include a first forming portion flange 3111 that extends from the first edge 311 in the direction of the inner case 120.

Since the second machine room forming surfaces 320 defining the two side surfaces of the machine room forming portion 300 are bilateral symmetry, one of them will be described. One of the second machine room forming surfaces 320 may include the second edge 322, third edge 323, fourth edge 324, and fifth edge 325. The second edge 322 may include a second forming portion flange 3222 that extends toward the inner case 120. The first forming portion flange 3111 and second forming portion flange 3222 may have the same EL. The third edge 323 may include a third forming portion flange 3233 that extends toward the tank installation portion 130. The third forming portion flange 3233 may be the same EL as the first forming portion flange 3111. Thus, the first forming portion flange 3111, second forming portion flange 3222, and third forming portion flange 3233 may be integrated with no gaps.

The fourth edge 324 may be bent after extending toward the side surface 112 of the outer case 110 and then extend toward the tank installation portion 130. Thus, the fourth edge 324 may become an L-shape flange viewed from the top so that it may be inserted into and coupled to the second outer case flange 1121. This may prevent the leakage of the foamed plastics by coupling a part of the second opening 115 to the machine room forming portion 300. The rest of the second opening 115 may be coupled to the first rear panel 141.

The fifth edge 325 may be bent after extending toward the side surface 112 of the outer case 110 and then extend toward the inner case 110. Thus, the fifth edge 325 may become an L-shape flange viewed from the front so that it may be inserted into and coupled to the first outer case flange 1111.

FIGS. 6 and 7 are views of multiple cross-sections of the steam nozzle 260 preassembled between the mounting surface 350 and the bottom surface 121 of the inner case 120.

Figure 6A:
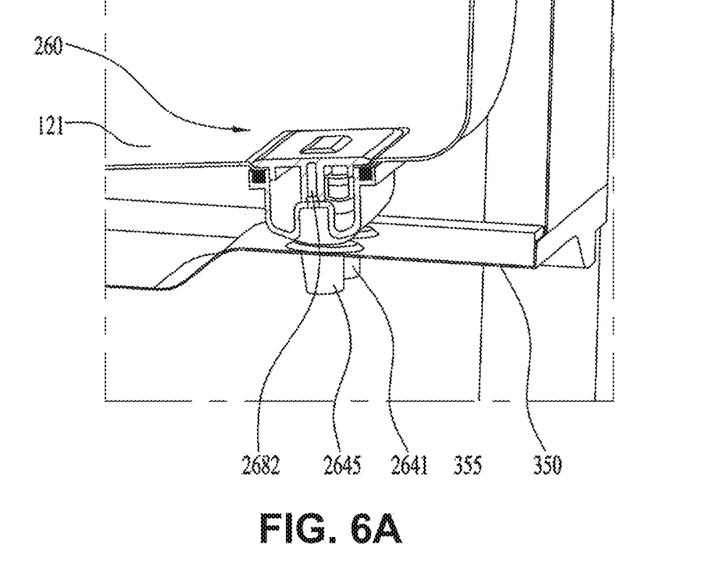
FIG. 6A shows a cross-section of the steam nozzle 260 preassembled between a mounting surface 350 and the inner case 120.
Figure 6B:
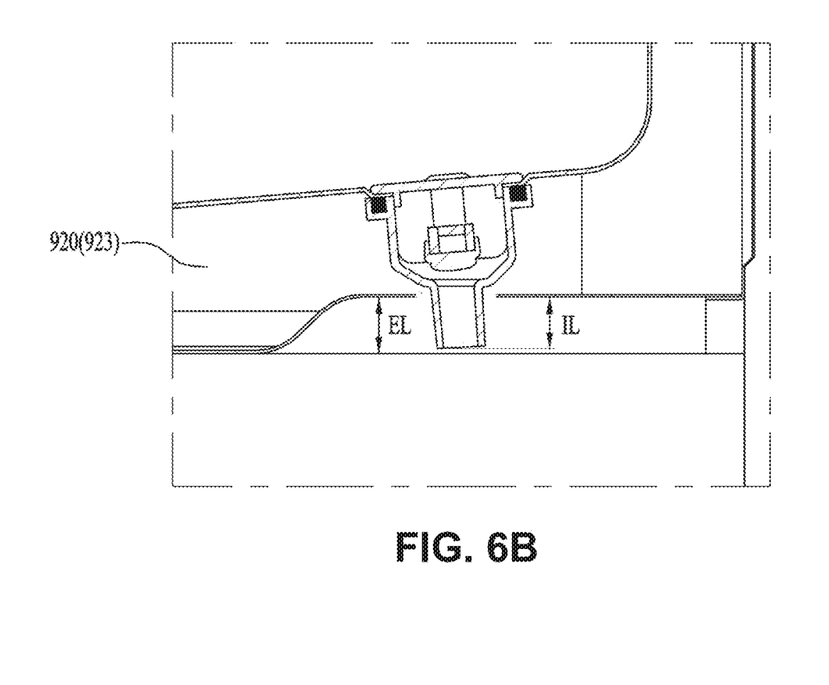
FIG. 6B shows another cross-section of the steam nozzle 260 preassembled between the mounting surface 350 and the inner case 120.

FIG. 6A shows a cross-section of the steam nozzle 260. FIG. 6B shows a cross-section of the steam nozzle 260 taken along line A-A'. Referring to FIG. 6B, the bottom surface 121 of the inner case 120 may be inclined toward the third through portion 1213. The reason for this is to discharge condensed steam through the third through portion 1213. Thus, the steam nozzle 260 may be installed such that it is inclined along the bottom surface 121 of the inner case 120. The steam nozzle 260 is mounted on the mounter surface 350. Specifically, the mounting surface 350 is penetrated by the steam inlet 2641 and steam outlet 2645 of the steam nozzle 260. Further, the mounting surface protruding portion 355 protrudes from the first mounting surface through hole 351 and second mounting surface through hole 352 on the mounting surface 350. The steam inlet 2641 and steam outlet 2645, which are tapered, penetrate the first mounting surface through hole 351 and second mounting surface through hole 352, respectively. Further, the steam inlet 2641 and steam outlet 2645 may be inserted with no gaps. Thus, when the foamed plastics are injected into the third foaming space 923, there is no leakage through the first mounting surface through hole 351 and second mounting surface through hole 352.

The first through portion 1211 may include a first through hole 12113, which is penetrated by a recess of the bottom surface 121 of the inner case 120 toward the machine room forming portion 300, and guiders 12111 and 12112 configured to couple the edge of the first through hole 12113 and the bottom surface 121 of the inner case 120. The guiders 12111 and 12112 may include a first guider 12111 coupled to the bottom surface 121 of the inner case 120 with an inclination and a second guider 12112 extending in parallel to the bottom surface 121 of the inner case 120 toward the first through hole 12113 from the first guider 12111.

The steam nozzle 260 may include a nozzle body 261, supply pipes 2641 and 2645, and a steam discharger 263. The nozzle body 261 defines the exterior of the steam nozzle 260. The supply pipes 2641 and 2645 are connected to the nozzle body 261 and inserted into the mounting surface through hole 351 and 352 at the other end thereof so that the supply pipes 2641 and 2645 provide steam supplied by the steam generator 250 to the nozzle body 261. The steam discharger 263 discharges steam inside the nozzle body 260.

The nozzle body 261 may include a first body 2611 and a second body 2615. The first body 2611 may be mounted on the first through portion 1211 and configured to discharge steam into the inner case 120, and the second body 2615 may be disposed on the mounting surface 350 and include the supply pipes 2641 and 2645. The supply pipes 2641 and 2645 may include the steam inlet 2641 inserted into the first mounting surface through hole 351 and the condensate water outlet 2645 inserted into the second mounting surface through hole 352.

The first body 2611 may include a first nozzle surface 2612 for mounting on the second guider 12112, the steam discharger 263 disposed on the first nozzle surface 2612 and configured to discharge steam, and a first body partition 2613 protruding from the first nozzle surface 2612 and inserted into the first through hole 12113.

The second body 2615 may include a second nozzle surface 2616, a nozzle side surface 2617, a second body partition 2618, and a third body partition 2619. The condensate water outlet 2645 and steam inlet 2641 may be disposed on the second nozzle surface 2616. The nozzle side surface 2617 may extend from the second nozzle surface 2616 and define the side surface of the second body 2615 to form a steam holding space in the second body 2615. The second body partition 2618 may extend from the nozzle side surface 2617 and be in contact with the second guider 12112. The first body partition 2613 may be inserted into the second body partition 2618. The third body partition 2619 may protrude from the nozzle side surface 2617 with an inclination and then be bent so as to form a sealing space 265 together with the second body partition 2618 and second guider 12112.

A sealing member 267 may be inserted into the sealing space 265 to prevent the leakage of the foamed plastics during the foam molding and at the same time to prevent steam leakage. Compared to the conventional laundry treating apparatus, since only one sealing member is used, manufacturing may be simplified.

The sealing member 267 may be made of rubber or silicon. The cross-section thereof may be a quadrangle as shown in the drawings, or it may be a circle. The sealing member 267 may be made of any materials and have any cross-sections if it is capable of being mounted in the sealing space 265 and preventing the leakage of the steam and foamed plastics.

Referring to FIG. 6A, the steam inlet 2641 may include a steam inlet body 26411 and a steam vent 26412. The steam inlet body 26411 penetrates the second nozzle surface 2616 and protrudes toward a steam storage space. The steam vent 26412 is configured to discharge steam into the steam storage space. The steam vent is provided in the direction of the condensate water outlet 2645. Thus, when the steam is discharged into the steam storage space, the steam may move along the steam inlet body 26411, and the flow direction of the steam may change at the end of the steam inlet body 26411.

The steam inlet 2641 is formed in the shape of a tapered pipe and protrudes toward the steam storage space. The steam vent 26412 may be provided on a cylindrical surface, instead of blocking the end of the pipe. In this case, when steam flows toward the inner case 110 along the steam inlet body 26411, the steam may change its flow direction at the steam vent 26412 and then be discharged. The reason for this is to prevent condensate water or moisture that may flow together with the steam from being discharged through the steam discharger 263.

The steam condensed in the steam storage space or the condensate water may be discharged through the condensate water outlet 2645, move toward a condensate water storage or sump (not shown), and be stored in a drainage tank (not shown) installed in the tank installation portion 130. To this end, the second nozzle surface 2616 defining the floor of the second body 2615 may be tilted toward the condensate water outlet 2645, instead of being flattened. Thus, the condensed water may move to the condensate water outlet 2645 by gravity. When the steam inlet 2641 and condensate water outlet 2645 are inserted, a part of the second nozzle surface 2616 in contact with the first mounting surface through hole 351 and second mounting surface through hole 352 may be provided in parallel to the mounting surface 350. Thus, it may prevent the leakage of the foamed plastics by filling the first mounting surface through hole 351 and second mounting surface through hole 352.

Figure 7A:
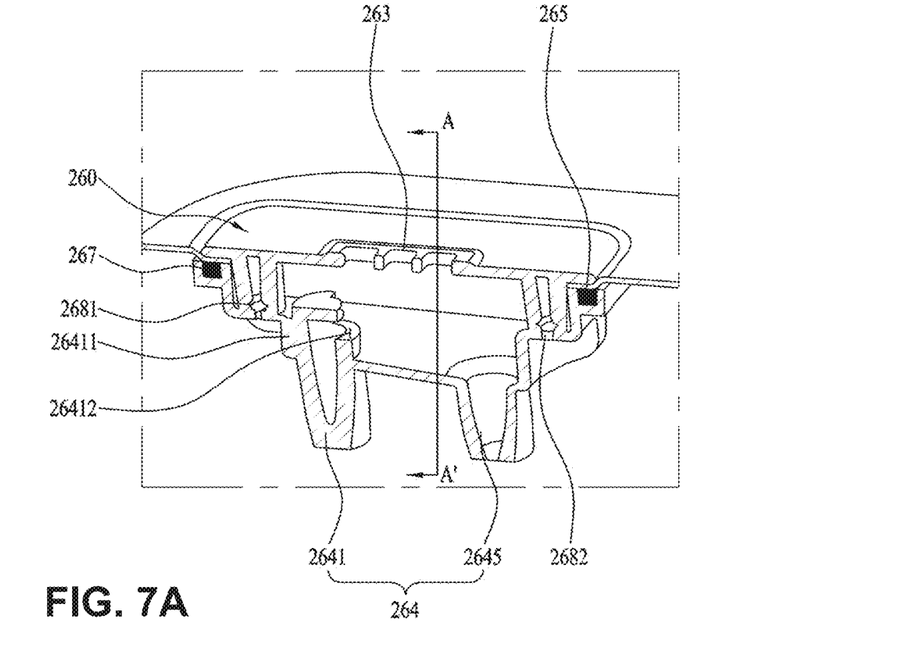
FIG. 7A shows still another section of the steam nozzle 260 preassembled between the mounting surface 350 and the inner case 120.

FIG. 7A shows that the first body 2611 is tilted from the bottom surface 121 of the inner case 120. The first mounting surface through hole 351 and second mounting surface through hole 352 may be placed side-by-side at the same distance in the direction from the first opening 113 to the second opening 114.

Figure 7B:
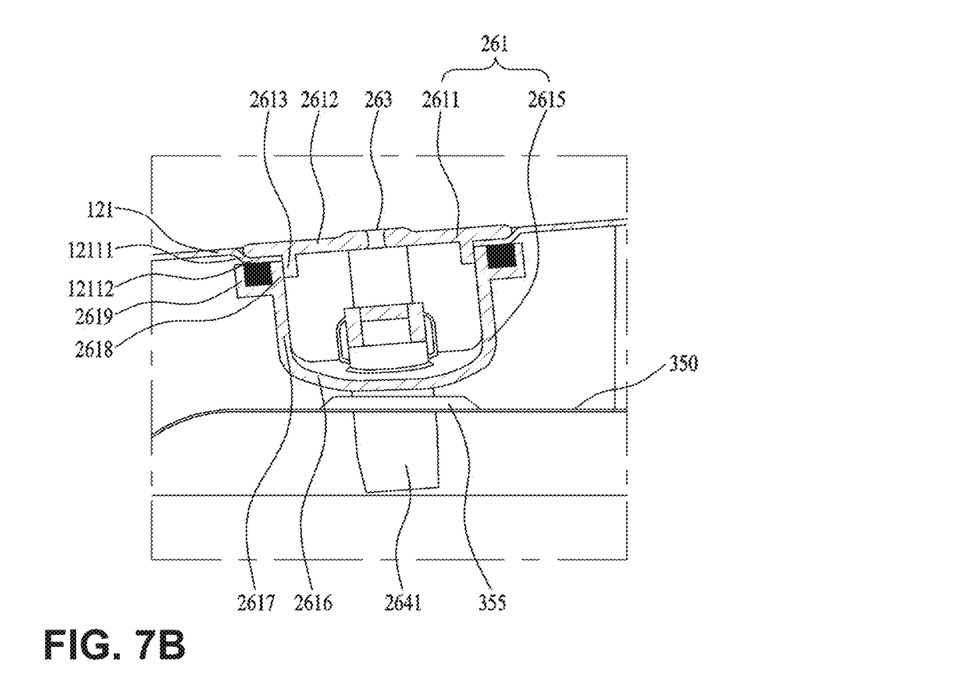
FIG. 7B shows a further cross-section of the steam nozzle 260 preassembled between the mounting surface 350 and the inner case 120.

Referring to FIG. 7B, the steam inlet 2641 and condensate water outlet 2645 may have the same IL. The IL of the steam inlet 2641 and condensate water outlet 2645 may be designed to be smaller than the EL of the mounting surface 350.

To prevent the machine room forming portion 300 (see FIG. 2A) from being deformed by the foaming pressure during the foam molding or from being changed unexpectedly during the hardening of the foamed plastics, the intermediate mold, intermediate jig, etc. may be inserted so that the machine room 200 (see FIG. 2B) may act as the secondary supporter (not shown). In this case, the insertion of the intermediate mold or zig may be disturbed by the steam inlet 2641 and condensate water outlet 2645 disposed in the steam nozzle 260, which are illustrated in FIG. 7. To avoid this problem, the IL of the steam inlet 2641 and condensate water outlet 2645 may be designed to be smaller than the EL of the mounting surface 350.

Although specific embodiments have been illustrated and described herein, those of ordinary skill in the art appreciate that the specific embodiments may be substituted with any arrangement which are calculated to achieve the same purpose and that the present disclosure has other applications in other environments. It should be understood that the present disclosure is intended to cover any adaptations or variations of the present disclosure. The following claims are in no way intended to limit the scope of the present disclosure to the specific embodiments described herein. Thus, it is clear that all modifications are included in the scope of the appended claims and their equivalents as long as they include the components as claimed in the claims of the present disclosure.

What is claimed is:

1. A laundry treating apparatus, comprising:
    an outer case having a first opening, the first opening formed by opening a front side of the outer case;
    an inner case provided inside the outer case and defining a space for holding clothes;
    an inner case bottom surface defining a floor of the inner case;
    a first through portion penetrating the inner case bottom surface;
    a machine room forming portion located below the inner case and defining a machine room inside the machine room forming portion, wherein the machine room forming portion comprises a first machine room forming surface defining a top side of the machine room, and wherein the first machine room forming surface includes a mounting surface elevated toward the inner case bottom surface from a portion of the first machine room forming surface, and a mounting surface through hole penetrating the mounting surface;
    a steam generator provided in the machine room and configured to generate steam; and
    a steam nozzle comprising a nozzle body located between the first through portion and the mounting surface through hole, a supply pipe configured to provide the steam generated by the steam generator into the nozzle body, wherein a first end of the supply pipe is coupled to the nozzle body and a second end thereof is inserted into the mounting surface through hole, a steam discharger configured to discharge the steam in the nozzle body into the inner case.

2. The laundry treating apparatus of claim 1, wherein the mounting surface through hole comprises a first mounting surface through hole and a second mounting surface through hole,
    wherein the supply pipe comprises a steam inlet configured to receive the steam and a condensate water outlet configured to discharge condensed steam,
    wherein the steam inlet is inserted into the first mounting surface through hole, and
    wherein the condensate water outlet is inserted into the second mounting surface through hole.

3. The laundry treating apparatus of claim 2, wherein the nozzle body comprises:
    a first body mounted in the first through portion and comprising the steam discharger configured to discharge the steam into the inner case; and
    a second body coupled to the mounting surface and comprising the supply pipe.

4. The laundry treating apparatus of claim 3, further comprising:
a first foaming space formed between a top portion of the inner case and a top portion of the outer case;
a second foaming space formed between a side surface of the inner case and a side surface of the outer case;
a third foaming space formed between a top portion of the machine room forming portion and a bottom surface of the outer case; and
foamed plastics configured to fill the third foaming space, wherein the first and second bodies are assembled with the inner case and the machine room forming portion before injection of the foamed plastics and configured to prevent the foamed plastics from leaking through the first mounting surface through hole, the second mounting surface through hole, and the first through portion during the injection of the foamed plastics.

5. The laundry treating apparatus of claim 4, wherein after assembly of the steam nozzle with the first through portion and the mounting surface, an inserted length of the steam inlet inserted into the mounting surface through the first mounting surface through hole and an inserted length of the condensate water outlet inserted into the mounting surface through the second mounting surface through hole are smaller than an elevated length of the mounting surface elevated from the first machine room forming surface.

6. The laundry treating apparatus of claim 5, wherein the outer case further comprises a second opening,
wherein the laundry treating apparatus further comprises a rear panel coupled to the second opening and defining a rear surface of the outer case, and
wherein the rear panel comprises a first rear panel coupled to the second opening and defining a rear surface at a position corresponding to the inner case and a second rear panel coupled to the second opening and defining a rear surface at a position corresponding to the machine room forming portion.

7. The laundry treating apparatus of claim 6, wherein the mounting surface comprise a part of a first edge in parallel to the rear panel on the first machine room forming surface,
wherein the first edge comprises a first forming portion flange formed by bending and extending.

8. The laundry treating apparatus of claim 5, wherein the first through portion comprises:
a first through hole penetrated by a recess of the inner case bottom surface toward the machine room forming portion; and
a guider configured to couple an edge of the first through hole and the inner case bottom surface, the guider comprising:
a first guider coupled to the inner case bottom surface with an inclination; and
a second guider extending from the first guider toward the first through hole in parallel to the inner case bottom surface.

9. The laundry treating apparatus of claim 8, wherein the first body comprises:
a first nozzle surface for mounting on the second guider;
the steam discharger located on the first nozzle surface and configured to discharge the steam; and
a first body partition protruding from the first nozzle surface and surrounding the steam discharger, wherein the first body partition is inserted into the first through hole, and wherein the second body comprises:
a second nozzle surface, wherein the condensate water outlet and the steam inlet are located on the second nozzle surface;
a nozzle side surface extending from the second nozzle surface and defining a side surface of the second body to define a steam storage space for storing the steam inside the second body;
a second body partition extending from the nozzle side surface and in contact with the second guider, wherein the first body partition is inserted into the second body partition; and
a third body partition defining a sealing space together with the second body partition and the second guider, wherein the third body partition vertically protrudes from the nozzle side surface and bends, and
wherein a sealing member is inserted into the sealing space to prevent the foamed plastics and the steam from leaking.

10. The laundry treating apparatus of claim 9, wherein the steam inlet comprises:
a steam inlet body penetrating the second nozzle surface and protruding toward the steam storage space; and
a steam vent configured to discharge the steam into the steam storage space,
wherein the steam vent is provided toward the condensate water outlet so that when the steam is discharged into the steam storage space, the steam flowing along the steam inlet body changes a flow direction at an end of the steam inlet body.

11. The laundry treating apparatus of claim 10, wherein the second nozzle surface is inclined downward toward the condensate water outlet.

12. The laundry treating apparatus of claim 2, wherein the inner case bottom surface further comprises:
an air supplier configured to supply air to the inner case; and
an air discharger provided toward of the first opening and configured to discharge the air in the inner case, and
wherein the inner case bottom surface is inclined toward the air discharger.

13. The laundry treating apparatus of claim 4, wherein the foamed plastics are any one of polyurethane, polystyrene, and polyolefin.

14. The laundry treating apparatus of claim 1, further comprising:
a first foaming space formed between a top portion of the inner case and a top portion of the outer case;
a second foaming space formed between a side surface of the inner case and a side surface of the outer case;
a third foaming space formed between the top portion of the machine room forming portion and the inner case bottom surface; and
foamed plastics configured to fill the first foaming space, the second foaming space, and the third foaming space,
wherein a portion of the steam nozzle is located in the third foaming space.

15. The laundry treating apparatus of claim 1, wherein an inserted length of the supply pipe inserted into the mounting surface through hole from the mounting surface is smaller than an elevated length of the mounting surface with respect to the first machine room forming surface.

* * * * *